Oct. 7, 1924.

N. H. CEDERQUIST

MECHANICAL MOTION

Filed Aug. 21, 1922

2 Sheets-Sheet 1

1,511,049

INVENTOR.
Nils Herman Cederquist.
BY Nestall and Wallace
ATTORNEYS.

Oct. 7, 1924.

N. H. CEDERQUIST

MECHANICAL MOTION

Filed Aug. 21, 1922

1,511,049

2 Sheets-Sheet 2

INVENTOR.
Nils Herman Cederquist.
BY
ATTORNEYS.

Patented Oct. 7, 1924.

1,511,049

UNITED STATES PATENT OFFICE.

NILS HERMAN CEDERQUIST, OF LOS ANGELES, CALIFORNIA.

MECHANICAL MOTION.

Application filed August 21, 1922. Serial No. 583,222.

*To all whom it may concern:*

Be it known that I, NILS HERMAN CEDERQUIST, a citizen of the United States, and resident of Los Angeles, in the county of Los Angeles and State of California, have invented new and useful Improvements in Mechanical Motion, of which the following is a specification.

This invention relates to mechanical movement, and is especially useful with a variable pitch propeller. The objects of this invention are first, to provide a device whereby a linear movement may be changed to a rotary movement; second, to provide a device operable by a lever, whereby a comparatively limited movement of the lever will produce a relatively large number of revolutions of the rotatable member; and third, to provide a strong, durable, and simple structure.

Figure 1:
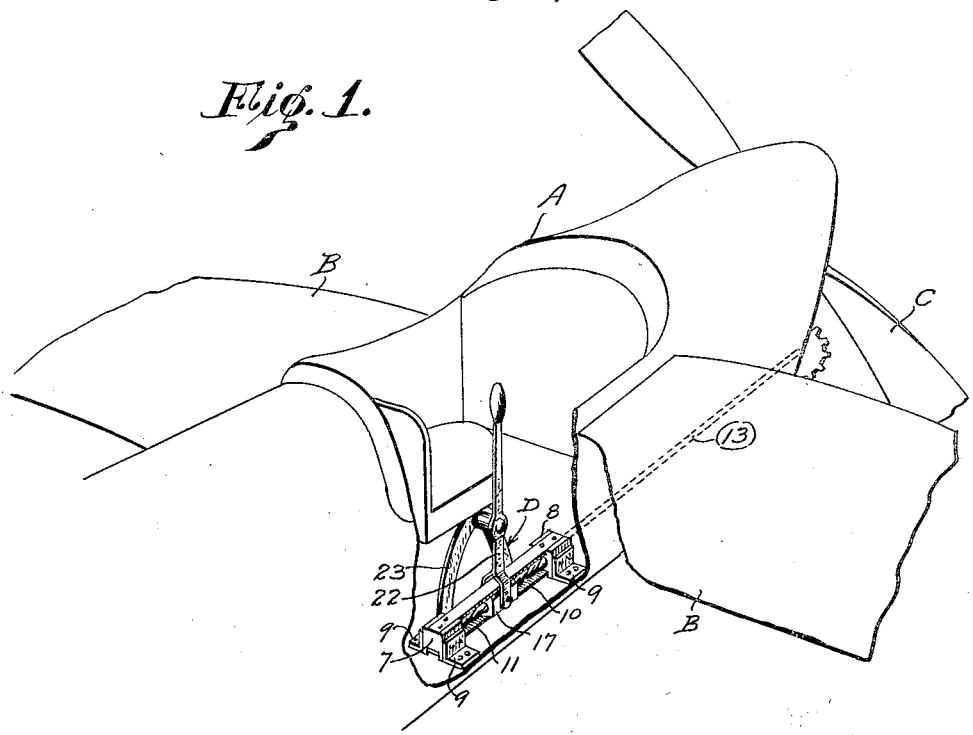
Figure 2:
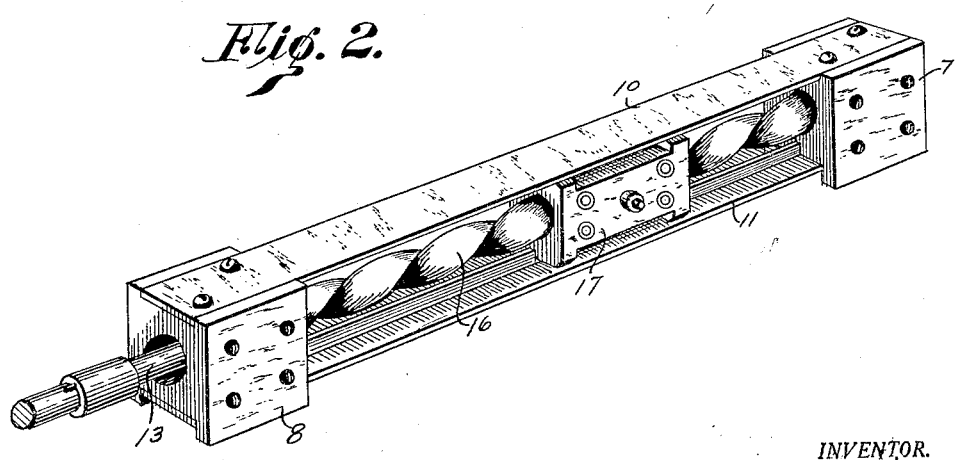
Figure 3:
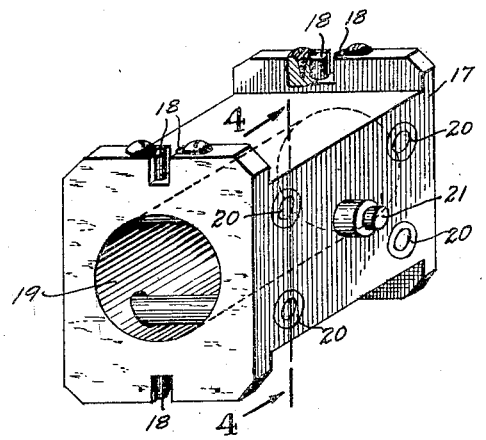
Figure 4:
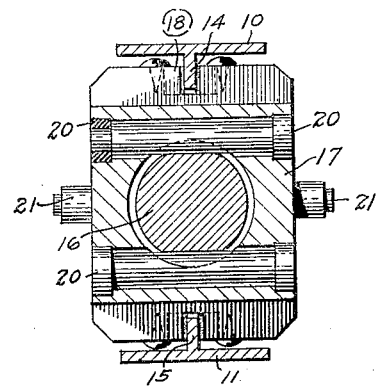
Figure 5:
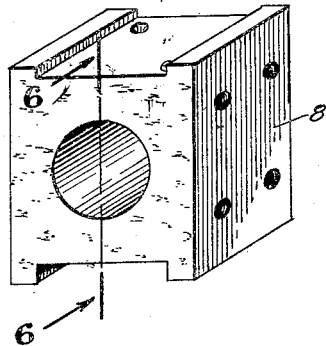
Figure 6:
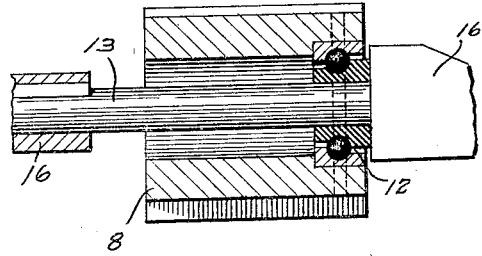

These objects together with other objects and corresponding accomplishments are obtained by means of the embodiment of my invention illustrated in the accompanying drawings, in which:

Fig. 1 is a perspective view of a fragment of an aeroplane with my improved movement installed therein, parts of the fuselage being broken away to better show the structure; Fig. 2 is a perspective view of the screw shaft and the sliding block upon an enlarged scale; Fig. 3 is a perspective view of the sliding block removed from the guide way; Fig. 4 is a section as seen on the line 4—4 of Fig. 3 together with the guide way; Fig. 5 is a sectional view of an end block; and Fig. 6 is a section as seen on the line 6—6 of Fig. 5.

Referring more particularly to Fig. 1, a fuselage of an aeroplane is indicated by A. Aerofoils are indicated by B. The type of plane is not material to the present invention. At the front of the plane is a propeller C. This propeller may be of a variable pitch type and the details of construction are not important. Mounted in the fuselage with the lever handle in position for operation by the pilot is my improved mechanical movement indicated by D.

Referring more particularly to the movement, bearing blocks 7 and 8 are secured to the floor by means of angle brackets 9. The bearing blocks 7 and 8 are recessed at the tops and bottoms to receive guide rails 10 and 11. The block 8 has a ball bearing 12 to receive the shaft 13 which extends therethrough. The other end of the shaft is journalled in block 7. Rails 10 and 11 are secured to the bearing blocks 7 and 8 by any suitable means such as screws and are provided at the centers with legs 14 and 15.

Keyed to the shaft 13 is a screw shaft 16, consisting of a helically twisted bar. Mounted between the rails 10 and 11 is the slide block 17. The ends of the slide block are recessed to receive the legs 14 and 15. In the recesses are rollers 18. The rollers bear against the legs of the rail and assist in guiding blocks without friction. Extending through the slide block is an aperture 19 of a little larger internal diameter than the screw 16. Extending across the slide block and lying partially within apertures 19 are rollers 20. The screws 16 and rollers 19 are so designed that the rollers have a line contact with the screw across its face. Extending from the sides of the slide block are trunnions 21 to receive bifurcated ends of a lever 22 which is pivoted upon the standard 23.

It is obvious that by sliding the block 17 backwardly and forwardly between the rails that screw 16 will be turned. This causes the shaft 13 to be turned. The lever 22 is convenient to the pilot of the machine by pulling backwardly or pushing forwardly upon the lever. The slide block is moved in a linear direction. This causes the screw and shaft 13 to be rotated and a linear motion to be transformed to a rotary motion. The rotary motion of the shaft may be transmitted through gears or any other suitable mechanism to the parts which it is desired to revolve or otherwise act upon.

What I claim is:

In a mechanical motion, a frame comprising spaced bearing blocks, T-rails joining said bearing blocks, a slide block mounted on said rails for reciprocation and having a bore extending therethrough, a screw journalled in said bearing blocks and extending through said bore, oppositely disposed rollers in said slide block extending transverse thereto and meshing with said screw so that linear movement of said slide block will cause rotation of said screw, oppositely disposed pintles on said slide blocks and a lever for reciprocating said slide blocks having one arm thereof provided with a bifurcated end straddling said slide block and pivotally secured to said pintles, said lever being pivotally mounted intermediate its ends.

In witness that I claim the foregoing I have hereunto subscribed my name this 8th day of August, 1922.

NILS HERMAN CEDERQUIST.